United States Patent
Itagaki et al.

(10) Patent No.: US 7,193,026 B2
(45) Date of Patent: Mar. 20, 2007

(54) ORGANOSILICON COMPOUND-CURING COMPOSITION AND SILICONE-BASE COATING COMPOSITION

(75) Inventors: Akinari Itagaki, Usui-gun (JP); Masahiro Yoshizawa, Usui-gun (JP); Masaaki Yamaya, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 133 days.

(21) Appl. No.: 10/868,963

(22) Filed: Jun. 17, 2004

(65) Prior Publication Data
US 2004/0260048 A1 Dec. 23, 2004

(30) Foreign Application Priority Data
Jun. 19, 2003 (JP) .............................. 2003-174670

(51) Int. Cl.
*C08G 77/08* (2006.01)
(52) U.S. Cl. .................. 528/23; 525/477; 525/479
(58) Field of Classification Search ................. 528/23; 525/477, 479
See application file for complete search history.

(56) References Cited

U.S. PATENT DOCUMENTS 5,366,768 A * 11/1994 Kasari et al. ............ 427/407.1

6,319,980 B1 * 11/2001 Ishikawa et al. ............ 524/588

FOREIGN PATENT DOCUMENTS

| JP | 60-233164 A | 11/1985 |
|----|-------------|---------|
| JP | 3-64380 A | 3/1991 |
| JP | 10-60377 A | 3/1998 |
| JP | 2002-356652 A | 12/2002 |

* cited by examiner

*Primary Examiner*—Kuo-Liang Peng
(74) *Attorney, Agent, or Firm*—Birch, Stewart, Kolasch & Birch, LLP

(57) ABSTRACT

A curing composition comprising (A) a silane compound having formula: $R^1{}_2Si(OR^2)_2$ wherein $R^1$ is $C_1$–$C_3$ alkyl, $C_2$–$C_3$ alkenyl or phenyl, and $R^2$ is $C_1$–$C_3$ alkyl, $C_2$–$C_3$ acyl or $C_3$–$C_5$ alkoxyalkyl and (B) phosphoric acid is added to an organosilicon compound to formulate a silicone-base coating composition which remains shelf stable and quickly cures at room temperature after being applied to a substrate, to form a cured coating having transparency, surface hardness, adhesion and the like. A silicone-base coating composition having the curing composition formulated therein is effective as a solventless, RTV silicone coating composition of one part type.

6 Claims, No Drawings

ORGANOSILICON COMPOUND-CURING COMPOSITION AND SILICONE-BASE COATING COMPOSITION

This Nonprovisional application claims priority under 35 U.S.C § 119(a) on Patent Application No(s). 2003-174670 filed in JAPAN on Jun. 19, 3003, the entire contents of which are hereby incorporated by reference.

TECHNICAL FIELD

This invention relates to a curing agent composition, and more particularly to a curing composition for use with organosilicon compounds, that is to be added to a curable organosilicon compound in the form of a silane compound and/or a partial (co)hydrolytic condensate thereof to formulate a silicone-base coating composition which is shelf stable, quickly cures at room temperature after being applied to a substrate, to form a cured coating having transparency, surface hardness, flexibility, recoat property, and adhesion, and is thus capable of imparting to the substrate various functions including surface protection, water repellency, rust prevention, water resistance, weather resistance, chemical resistance and stain resistance.

BACKGROUND ART

Unlike other organic resins, silicone resins have superior heat resistance, weather resistance, water resistance, and flame retardance and are capable of forming a high hardness surface. Then curable silicone resins having crosslinkable groups such as alkoxy and silanol groups attached to silicon atoms in a molecule are widely used in a variety of fields and applications including surface protective materials, heat resistant paint, weather resistant paint, water repellents, and binders. In the recent years, the range of their application is expanding as evidenced by their use as a binder for a hydrophilicity-imparting coating composition intended for preventing surface staining, and their use under study as a low dielectric constant material for forming interlayer dielectric film.

Inter alia, silicone coating compositions are used as coating agents which are coated to various articles such as daily commodities, industrial instruments, and various equipment for traffic facilities, including furniture, fittings, floors, wood, stone, metal plates, building materials, electric appliances, automotive exteriors, interiors and exteriors of residential houses, buildings and concrete structures for providing protection to the surface of the articles. The surface protection with silicone coating compositions is intended for the prevention of mars and flaws, the prevention of corrosion, prevention of stains, the prevention of degradation by ultraviolet radiation, sea water, wind and weather, and improvements in outer appearance or luster.

Of such silicone coating compositions, solutions of curable silicone resins having terminal silanol groups and an average molecular weight of about 3,000 to about 2,000,000 in organic solvents such as toluene and xylene, generally referred to as silicone varnish solutions, are most often used in the art. These silicone varnish solutions can form coatings having the excellent properties of surface hardness, adhesion, heat resistance, weather resistance and water resistance, although they still suffer from the following problems.

(1) Organic solvents having a low flash point are essentially included.

(2) Since dehydrating condensation/crosslinking reaction between silanol groups is utilized, a long term of heat curing at a temperature of at least 150° C. is generally necessary to form a coating. As a result, the type of applicable substrates is limited, a vast amount of energy is needed for curing, and the manner of application is limited to the in-line application process, so that the in situ application is essentially impossible.

(3) Although the curing temperature can be lowered to some extent by the combined use of a crosslinking agent and a curing catalyst for promoting crosslinking reaction, the shelf stability consideration requires that the composition be of two part type wherein these components are added and mixed immediately before application.

Under these circumstances, there is a need for a solventless, room temperature vulcanizable silicone coating composition of one part type which is free of an organic solvent, curable at room temperature, and stable during shelf storage. To this end, the use of a silicone alkoxy oligomer having a relatively low molecular weight obtained through partial (co)hydrolytic condensation of an organoalkoxysilane(s) is under consideration. Further investigations have been made on curing catalysts that can effectively promote hydrolytic reaction with moisture and alcohol-removal condensation reaction of this silicone alkoxy oligomer for forming a coating crosslinked through siloxane bonds.

As one solution to the above problems, the applicant previously proposed a coating organopolysiloxane composition as set forth in JP-A 60-233164. This composition is essentially composed of three components: a partially hydrolyzed oligomer of an alkyltrialkoxysilane, a mono- or di-functional alkoxysilane, and an organometallic compound, typically an aluminum chelate compound. The resulting organopolysiloxane composition for coating is free of an organic solvent and remains stable during shelf storage. When applied to a substrate, the composition cures at room temperature into a coating having a high hardness, good substrate adhesion, and weather resistance. Regrettably, it takes a relatively long time of about one hour until the composition becomes tack-free after application. The composition has poor recoat property in repairing the once coated surface. It would be desirable to have a fast-cure organopolysiloxane composition.

For reducing the cure time at room temperature, the applicant proposed a coating resin composition as set forth in JP-A 3-64380. This composition is essentially composed of three components: an acid having at least two hydrogen atoms as acid groups in a molecule, such as phosphoric acid and/or an anhydride thereof, an epoxy group-containing alkoxysilane and/or a partial (co)hydrolyzate thereof, and an organosilane containing at least two alkoxy groups and/or a partial (co)hydrolyzate thereof. The composition becomes tack-free within a short time of 10 minutes or less at 25° C., forming a coating having a very high hardness, water resistance and solvent resistance. In this composition, the epoxy group-containing and epoxy-free silane compounds or partial (co)hydrolyzates thereof are essentially constructed of trifunctional silane units, and the partial (co)hydrolyzate of alkoxysilane containing a number of active silanol groups is used without further processing. Thus, the combined use of an alcohol component such as isopropyl alcohol is essentially required for the purpose of holding down thickening and gelation after mixing of various components. Even so, the drawback of storage instability is unavoidable as is found a thickening with the passage of time during storage. The composition must thus be of two part type. There is a need for a further improvement.

Curing catalysts commonly used for the aforementioned curable silicone resins having crosslinkable groups such as alkoxysilyl and silanol groups include organic amines such as triethanolamine; organic amine salts such as dimethylamine acetate; quaternary ammonium salts such as tetramethylammonium hydroxide and organosilicone quaternary ammonium salts; alkali or alkaline earth metal salts of organic acids such as sodium hydrogen carbonate and sodium acetate; aminoalkylsilane compounds such as γ-aminopropyltriethoxysilane and N-(β-aminoethyl)-γ-aminopropyltrimethoxysilane; metal salts of carboxylic acids such as iron octylate and zinc octylate; organotin compounds such as dibutyltin dilaurate, dibutyltin dioctate and dioctyltin dilaurate; titanates such as tetraisopropyl titanate and tetrabutyl titanate; and organoaluminum compounds such as acetylacetone aluminum salt. Simply adding these curing catalysts is difficult to solve all the problems.

In this regard, it has been considered to combine curing catalysts of different types. JP-A 10-60377 discloses a coating composition comprising four components: a silanol group-containing polyorganosiloxane, a glycidoxypropyl group-containing alkoxysilane, a difunctional alkoxysilane, and a curing catalyst which is a mixture of an organotin compound and a carboxylic acid amine salt. However, its curing time at room temperature and coating hardness are below the satisfactory level, and the composition is still short in storage stability.

JP-A 2002-356652 discloses a coating composition comprising three components: a silicone oligomer containing silanol and alkoxy groups, a curing catalyst which is a mixture of a metal chelate compound, a volatile acid and an amine-derived silane coupling agent, and a solvent mixture of a specific ester, ketone and ether. This composition has problems including the presence of organic solvents, a prolonged curing time for coatings of increased thickness, and difficulty to form fully hard coatings.

SUMMARY OF THE INVENTION

Therefore, an object of the invention is to provide a curing composition for organosilicon compounds, that is free of an organic solvent and is added to a curable organosilicon compound to formulate a silicone-base coating composition which remains shelf stable and quickly cures at room temperature after being applied to a substrate, to form a cured coating having transparency, surface hardness, adhesion and the like, without detracting from the inherent properties of the organosilicon compound. Another object is to provide a silicone-base coating composition having the curing composition formulated therein, which is effective as a solventless, room temperature vulcanizable (RTV) silicone coating composition of one part type.

It has been found that a curing composition having premixed (A) a difunctional silane compound of formula (1) and (B) phosphoric acid has a high cure capability to an organosilicon compound which is curable through condensation reaction. Particularly when this curing composition is incorporated in a silicone-base coating composition primarily comprising (C) a silane compound of formula (2) or a partial (co)hydrolytic condensate thereof or a mixture thereof, there is obtained a coating composition which cures at room temperature to a tack-free state within a short time, is effective to work, and has good transparency, surface hardness, abrasion resistance and adhesion. By altering the structure of component (C) or by adding, in addition to component (C), (D) a polyorganosiloxane compound containing in its molecule a silicone oil structure and a silicone resin structure having alkoxy groups and/or silanol groups, which is compatible with component (C) and the components of the curing composition, and/or (E) a (meth)acrylic resin containing hydrolyzable silyl groups and/or silanol groups, having a weight average molecular weight of 5,000 to 30,000, which is compatible with component (C) and the components of the curing composition, there is obtained a coating composition which is curable at room temperature to form a cured coating provided with various favorable functions including water repellency, rust prevention, water resistance, weather resistance, chemical resistance, stain resistance, flexibility, recoat property, and adhesion to organic resins.

Since the thus obtained coating composition essentially eliminates a need to dilute with an organic solvent and remains stable during storage, it can be used as a solventless, RTV silicone coating composition of one part type.

In a first aspect, the present invention provides a curing composition for use with organosilicon compounds, comprising (A) 50 to 99.5% by weight of a silane compound having the general formula (1) and (B) 0.5 to 50% by weight of phosphoric acid.

$$R^1{}_2Si(OR^2)_2 \tag{1}$$

Herein $R^1$ is each independently a $C_1$–$C_3$ alkyl group, $C_2$–$C_3$ alkenyl group or phenyl group, and $R^2$ is each independently a $C_1$–$C_3$ alkyl group, $C_2$–$C_3$ acyl group or $C_3$–$C_5$ alkoxyalkyl group. Preferably, $R^1$ is selected from among methyl, ethyl and phenyl, and $R^2$ is selected from among methyl and ethyl.

In a second aspect, the present invention provides a silicone-base coating composition comprising in admixture, (C) 100 parts by weight of a curable organosilicon compound which is a silane compound having the general formula (2):

$$R^3{}_aSi(OR^2)_{4-a} \tag{2}$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group or $C_3$–$C_5$ alkoxyalkyl group, and "a" is 0, 1 or 2, or a partial (co)hydrolytic condensate thereof or a mixture thereof, and 1 to 200 parts by weight of the curing composition of the first aspect.

In one preferred embodiment, component (C) comprises a partial (co)hydrolytic condensate of a silane compound having formula (2) wherein $R^3$ is methyl, $R^2$ is methyl or ethyl, and a=1 or a partial cohydrolytic condensate of said silane compound and another silane compound having formula (2); and component (A) in the curing composition is a silane compound having formula (1) wherein $R^1$ is methyl and $R^2$ is methyl or ethyl.

In another preferred embodiment, component (C) comprises a partial cohydrolytic condensate of a silane compound having formula (2) wherein $R^3$ is methyl, $R^2$ is methyl or ethyl, and a=1 and a silane compound having formula (2) wherein $R^3$ is methyl, $R^2$ is methyl or ethyl, and a=2, or a partial cohydrolytic condensate of these silane compounds and another silane compound having formula (2); and component (A) in the curing composition is a silane compound having formula (1) wherein $R^1$ is methyl and $R^2$ is methyl or ethyl.

In a further preferred embodiment, component (C) comprises a silane compound having formula (2) wherein $R^3$ is propyl, $R^2$ is methyl or ethyl, and a=1 and/or a partial (co)hydrolytic condensate thereof, or a partial cohydrolytic condensate of said silane compound and another silane compound having formula (2); and component (A) in the curing composition is a silane compound having formula (1) wherein $R^1$ is methyl and $R^2$ is methyl or ethyl.

In a still further preferred embodiment, component (C) comprises a silane compound having formula (2) wherein $R^3$ is phenyl, $R^2$ is methyl or ethyl, and a=1 or 1 and/or a partial (co)hydrolytic condensate thereof, or a partial cohydrolytic condensate of said silane compound and another silane compound having formula (2); and component (A) in the curing composition is a silane compound having formula (1) wherein $R^1$ is methyl or phenyl and $R^2$ is methyl or ethyl.

In a yet further preferred embodiment, component (C) comprises an epoxy-bearing silane compound and/or a partial (co)hydrolytic condensate thereof, or a partial cohydrolytic condensate of said epoxy-bearing silane compound and a silane compound having formula (2) wherein $R^3$ is methyl, $R^2$ is methyl or ethyl, and a=1, or a partial cohydrolytic condensate of these silane compounds and another silane compound having formula (2); and component (A) in the curing composition is a silane compound having formula (1) wherein $R^1$ is methyl and $R^2$ is methyl or ethyl.

As used herein, the term "$C_1$–$C_3$" groups, for example, designates groups having 1 to 3 carbon atoms.

DESCRIPTION OF THE PREFERRED EMBODIMENT

Curing Composition

Component (A) used in the organosilicon compound-curing composition of the invention is a silane compound having the general formula (1).

$$R^1{}_2Si(OR^2)_2 \quad (1)$$

In formula (1), $R^1$ which may be the same or different is a $C_1$–$C_3$ alkyl group, $C_2$–$C_3$ alkenyl group or phenyl group. Specifically, $R^1$ is an alkyl group selected from among methyl, ethyl, propyl and isopropyl, an alkenyl group selected from among vinyl and allyl, or a phenyl group.

$R^2$ is a $C_1$–$C_3$ alkyl group, $C_2$–$C_3$ acyl group or $C_3$–$C_5$ alkoxyalkyl group. Specifically, $R^2$ is an alkyl group selected from among methyl, ethyl, propyl and isopropyl, an acyl group such as acetyl, or an alkoxyalkyl group such as methoxyethyl, ethoxyethyl, propoxyethyl, methoxypropyl and ethoxypropyl.

The silane compound must be a so-called difunctional silane compound containing two hydrolyzable groups per molecule. The use of a monofunctional silane compound containing one hydrolyzable group per molecule raises a problem when a curing composition comprising the same is added to a silicone-base coating composition, that is, the monofunctional silane compound serves as an end-capping agent to lower a crosslinking density, requiring a prolonged curing time and resulting in a cured coating having a lower hardness. On the other hand, if a tri- or tetra-functional silane compound containing three or four hydrolyzable groups per molecule is used, gelation will occur shortly after it is mixed with the phosphoric acid (B) to be described later. This denies the use as a curing composition.

Illustrative, non-limiting examples of suitable silane compounds include dimethyldimethoxysilane, dimethyldiethoxysilane, dimethyldiisopropoxysilane, dimethyldiacetoxysilane, dimethylbis(methoxyethoxy)silane, dimethylbis(methoxypropoxy)silane, diethyldimethoxysilane, diethyldiethoxysilane, diethyldiisopropoxysilane, diethyldiacetoxysilane, methylethyldimethoxysilane, methylethyldiethoxysilane, methylethyldiisopropoxysilane, methylethyldiacetoxysilane, methylpropyldimethoxysilane, methylpropyldiethoxysilane, methylpropyldiisopropoxysilane, methylpropyldiacetoxysilane, divinyldimethoxysilane, divinyldiethoxysilane, divinyldiisopropoxysilane, divinyldiacetoxysilane, methylvinyldimethoxysilane, methylvinyldiethoxysilane, methylvinyldiisopropoxysilane, methylvinyldiacetoxysilane, diallyldimethoxysilane, diallyldiethoxysilane, diallyldiisopropoxysilane, methylallyldimethoxysilane, methylallyldiethoxysilane, methylallyldiisopropoxysilane, methylallyldiacetoxysilane, diphenyldimethoxysilane, diphenyldiethoxysilane, diphenyldiisopropoxysilane, diphenyldiacetoxysilane, diphenylbis(methoxyethoxy)silane, diphenylbis(methoxypropoxy)silane, methylphenyldimethoxysilane, methylphenyldiethoxysilane, methylphenyldiisopropoxysilane, and methylphenyldiacetoxysilane.

Of these silane compounds, those silane compounds of formula (1) wherein $R^1$ is selected from among methyl, ethyl and phenyl and $R^2$ is selected from among methyl and ethyl are preferred as long as versatility, cost and effective cure on use as an organosilicon compound-curing composition are concerned. Most preferred are dimethyldimethoxysilane and dimethyldiethoxysilane. It is also possible to use two or more silane compounds of different structures in combination as component (A).

Component (B) used in the organosilicon compound-curing composition of the invention is phosphoric acid. Examples include orthophosphoric acid and polyphosphoric acid. Orthophosphoric acid is most preferred for availability and effective cure on use as a silicone resin-curing composition.

The organosilicon compound-curing composition of the invention may be prepared by simply mixing amounts of both components (A) and (B). No particular limits are imposed on the temperature, time and order of addition during the mixing step. No special processing such as heating is necessary. The composition is readily prepared simply by agitating and admixing the components at room temperature for 10 minutes or longer. In one preferred procedure, component (A) is first fed, component (B) is slowly added while the system is cooled for the purpose of preventing component (A) from evaporating by the heat generated upon admixing, and the agitating and admixing is continued for 1 to 3 hours.

The mixing proportion of components (A) to (B) should be between 50/50 and 99.5/0.5 in weight ratio. If component (B) is less than 0.5, the resulting curing composition becomes less practical because a long curing time is necessary even when the curing composition is used in large amounts relative to the curable organosilicon compound. If component (B) is more than 50, a silicone-base coating composition prepared by adding the resulting curing composition to the curable organosilicon compound becomes less shelf stable and forms a cured coating having poor properties of water resistance and chemical resistance and a low surface hardness. Preferably the mixing proportion of (A)/(B) is between 70/30 and 95/5 in weight ratio.

Coating Composition

The silicone-base coating composition of the invention comprises a silane compound and/or a partial (co)hydrolytic condensate thereof and the curing composition defined above. Component (C) is a curable organosilicon compound which is a silane compound having the general formula (2) or a partial (co)hydrolytic condensate thereof or a mixture of two or more.

$$R^3{}_aSi(OR^2)_{4-a} \quad (2)$$

In formula (2), $R^3$ which may be the same or different is a substituted or unsubstituted monovalent $C_1$–$C_{10}$ hydrocarbon group. Examples include alkyl groups such as methyl, ethyl, propyl, butyl, hexyl, octyl and decyl, cycloalkyl groups such as cyclohexyl, alkenyl groups such as vinyl and allyl, aryl groups such as phenyl and tolyl, and substituted forms of the foregoing groups in which some or all of the hydrogen atoms are substituted with halogen atoms, such as chloromethyl, chloropropyl, trifluoropropyl, with cyano groups, such as cyanoethyl, with epoxy groups, such as glycidoxypropyl and epoxycyclohexylethyl, with (meth)acrylic groups, such as methacryloxypropyl and acryloxypropyl, with amino groups, such as aminopropyl and aminoethylaminopropyl, and with mercapto groups, such as mercaptopropyl.

$R^2$ is a $C_1$–$C_3$ alkyl group, $C_2$–$C_3$ acyl group or $C_3$–$C_5$ alkoxyalkyl group as illustrated above in connection with formula (1).

In formula (2), "a" is equal to 0, 1 or 2. For the curability of a silicone-base coating composition and the surface hardness, crack resistance and substrate adhesion of a cured coating, it is preferred that a silane compound of formula (2) wherein a=1 and/or a partial (co)hydrolytic condensate thereof account for at least 30 mol %, more preferably 40 to 100 mol %, based on the curable organosilicon compound as component (C). It is also preferred that a silane compound of formula (2) wherein a=0 and/or a partial (co)hydrolytic condensate thereof account for 0 to 40 mol % of component (C) and that a silane compound of formula (2) wherein a=2 and/or a partial (co)hydrolytic condensate thereof account for 0 to 60 mol % of component (C). When component (C) includes a silane compound of a=0 and/or a partial (co)hydrolytic condensate thereof in addition to a silane compound of a=1 and/or a partial (co)hydrolytic condensate thereof, a cured coating is increased in surface hardness. Too much proportions of the silane compound of a=0 may invite a likelihood of cracking. When a silane compound of a=2 and/or a partial (co)hydrolytic condensate thereof is further included in combination, a cured coating is provided with toughness and flexibility. Too much proportions of the silane compound of a=2 may adversely affect curability, resulting in declines of crosslinking density and surface hardness.

Illustrative, non-limiting examples of the silane compound and partial (co)hydrolytic condensate thereof include alkoxysilanes and acyloxysilanes such as tetramethoxysilane, tetraethoxysilane, tetraisopropoxysilane, methyltrimethoxysilane, methyltriethoxysilane, methyltriisopropoxysilane, methyltriacetoxysilane, methyltris(methoxyethoxy)silane, methyltris(methoxypropoxy)silane, ethyltrimethoxysilane, ethyltriethoxysilane, ethyltriisopropoxysilane, propyltrimethoxysilane, propyltriethoxysilane, propyltriisopropoxysilane, butyltrimethoxysilane, butyltriethoxysilane, hexyltrimethoxysilane, hexyltriethoxysilane, octyltrimethoxysilane, octyltriethoxysilane, decyltrimethoxysilane, decyltriethoxysilane, cyclohexyltrimethoxysilane, cyclohexyltriethoxysilane, vinyltrimethoxysilane, vinyltriethoxysilane, vinyltriisopropoxysilane, vinyltriacetoxysilane, vinyltris(methoxyethoxy)silane, vinyltris(methoxypropoxy)silane, allyltrimethoxysilane, allyltriethoxysilane, phenyltrimethoxysilane, phenyltriethoxysilane, phenyltriisopropoxysilane, phenyltriacetoxysilane, tolyltrimethoxysilane, tolyltriethoxysilane, chloromethyltrimethoxysilane, chloromethyltriethoxysilane, γ-chloropropyltrimethoxysilane, γ-chloropropyltriethoxysilane, 3,3,3-trifluoropropyltrimethoxysilane, 3,3,3-trifluoropropyltriethoxysilane, cyanoethyltriethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-methacryloxypropyltrimethoxysilane, γ-methacryloxypropyltriethoxysilane, γ-acryloxypropyltrimethoxysilane, γ-acryloxypropyltriethoxysilane, γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, N-phenyl-γ-aminopropyltrimethoxysilane, γ-mercaptopropyltrimethoxysilane, γ-mercaptopropyltriethoxysilane, dimethyldimethoxysilane, dimethyldiethoxysilane, dimethyldiisopropoxysilane, dimethyldiacetoxysilane, dimethylbis(methoxyethoxy)silane, dimethylbis(methoxypropoxy)silane, diethyldimethoxysilane, diethyldiethoxysilane, diethyldiisopropoxysilane, diethyldiacetoxysilane, methylethyldimethoxysilane, methylethyldiethoxysilane, methylethyldiisopropoxysilane, methylethyldiacetoxysilane, methylpropyldimethoxysilane, methylpropyldiethoxysilane, methylpropyldiisopropoxysilane, methylpropyldiacetoxysilane, divinyldimethoxysilane, divinyldiethoxysilane, divinyldiisopropoxysilane, divinyldiacetoxysilane, methylvinyldimethoxysilane, methylvinyldiethoxysilane, methylvinyldiisopropoxysilane, methylvinyldiacetoxysilane, diallyldimethoxysilane, diallyldiethoxysilane, diallyldiisopropoxysilane, methylallyldimethoxysilane, methylallyldiethoxysilane, methylallyldiisopropoxysilane, methylallyldiacetoxysilane, diphenyldimethoxysilane, diphenyldiethoxysilane, diphenyldiisopropoxysilane, diphenyldiacetoxysilane, methylphenyldimethoxysilane, methylphenyldiethoxysilane, methylphenyldiisopropoxysilane, methylphenyldiacetoxysilane, γ-chloropropylmethyldimethoxysilane, γ-chloropropylmethyldiethoxysilane, 3,3,3-trifluoropropylmethyldimethoxysilane, nonafluorohexylmethyldimethoxysilane, cyanoethylmethyldiethoxysilane, γ-glycidoxypropylmethyldiethoxysilane, β-(3,4-epoxycyclohexyl)ethylmethyldiethoxysilane, γ-methacryloxypropylmethyldimethoxysilane, γ-methacryloxypropylmethyldiethoxysilane, γ-acryloxypropylmethyldimethoxysilane, γ-aminopropylmethyldiethoxysilane, N-β-(aminoethyl)-γ-aminopropylmethyldimethoxysilane, γ-mercaptopropylmethyldiethoxysilane, etc. and partial (co)hydrolytic condensates thereof.

Of these silane compounds and silane compounds as partial (co)hydrolytic condensate precursors, those silane compounds of formula (2) wherein $R^3$ is an unsubstituted monovalent hydrocarbon group selected from among methyl, ethyl, propyl, vinyl, and phenyl or a substituted monovalent hydrocarbon group selected from among 3,3,3-trifluoropropyl, γ-glycidoxypropyl, β-(3,4-epoxycyclohexyl)ethyl, γ-methacryloxypropyl, γ-acryloxypropyl and γ-mercaptopropyl and $R^2$ is an alkyl group selected from among methyl and ethyl are preferred as long as versatility, cost, effective cure on use as a silicone-base coating composition, coating properties, function-imparting effect and shelf stability of the composition are concerned. Most preferred are those silane compounds of formula (2) wherein $R^3$ is an unsubstituted or substituted monovalent hydrocarbon group selected from among methyl, propyl, phenyl and γ-glycidoxypropyl and $R^2$ is as defined just above.

The partial (co)hydrolytic condensate used herein preferably ranges from a dimer (a disiloxane unit obtained by causing 1 mol of water to act on 2 mol of a silane compound and eliminating 2 mol of the thus formed alcohol) to a product of 100 monomeric units of a silane compound as described above, more preferably products of 2 to 50 monomeric units, even more preferably products of 2 to 30 monomeric units. It is also possible to use a partial cohydrolytic condensate derived from more than one silane compound. For the curable organosilicon compound serving as component (C), a silane compound as described above or a partial (co)hydrolytic condensate thereof may be used alone. Alternatively, a mixture of two or more silane compounds or partial (co)hydrolytic condensates having different structures may be used, or a mixture of a silane compound and a partial (co)hydrolytic condensate used.

The curable organosilicon compound (C) should preferably have a viscosity of 1 to 5,000 mm$^2$/s at 25° C., more preferably 3 to 1,000 mm$^2$/s at 25° C.

Note that the term "partial (co)hydrolytic condensate" is used in connection with the silicone-base coating composition of the invention. Referring to a partial (co)hydrolytic condensate of a silane compound having formula (2) wherein $R^3$ is methyl, $R^2$ is a group selected from methyl and ethyl and a=1, for example, the term designates a partial hydrolytic condensate obtained using that silane compound as the entirety or part of the charge. Included are a partial hydrolytic condensate of methyltrimethoxysilane alone, a partial hydrolytic condensate of methyltriethoxysilane alone, a partial cohydrolytic condensate of methyltrimethoxysilane and methyltriethoxysilane, and a partial cohydrolytic condensate of methyltrimethoxysilane and diphenyldimethoxysilane, to name a few. The proportion of another silane compound subject to cohydrolysis is preferably 0 to 50 mol %, more preferably 0 to 30 mol %.

In one embodiment of the invention using a partial (co)hydrolytic condensate of methyltrimethoxysilane and/or methyltriethoxysilane as an essential component for the curable organosilicon compound or component (C), there is obtained a silicone-base coating composition which effectively cures at room temperature and forms a cured coating having a favorable balance of properties including transparency, surface hardness, abrasion resistance, adhesion, weather resistance, rust prevention and chemical resistance. The composition is very useful as a coating agent for the surface protection of various articles.

In another embodiment, a silicone-base coating composition using methyltrimethoxysilane and/or methyltriethoxysilane and a partial cohydrolytic condensate of dimethyldimethoxysilane and/or dimethyldiethoxysilane as essential components for component (C) can form a cured coating having good transparency, water resistance, flexibility and weather resistance.

In a further embodiment, a silicone-base coating composition using a silane compound selected from propyltrimethoxysilane and propyltriethoxysilane and/or a partial (co)hydrolytic condensate thereof as an essential component for component (C) and optionally, a partial (co)hydrolytic condensate of methyltrimethoxysilane and/or methyltriethoxysilane can form a cured coating having good water repellency, flexibility and recoat property.

In the event a silane compound of formula (2) wherein $R^3$ is phenyl and a=1 or 2 and/or a partial (co)hydrolytic condensate thereof is used as component (C), a long time is taken for curing in the presence of conventional catalysts used in the art, for example, titanium and aluminum-base organometallic catalysts. Curing at room temperature is difficult, particularly when component (C) has a high phenyl content of at least 40 mol % based on the entire $R^3$ groups. In contrast, when the silicone resin-curing composition of the invention is incorporated in a coating composition, the coating composition becomes room temperature curable and forms a cured coating having good surface luster, flexibility, recoat property and affinity to organic resins. In this embodiment, a partial hydrolytic condensate of a phenyltrialkoxysilane alone can be used as the partial (co)hydrolytic condensate, although a partial (co)hydrolytic condensate of a phenyltrialkoxysilane and a methyl-bearing silane compound is advantageously used such as a partial cohydrolytic condensate of a phenyltrialkoxysilane and a methyltrialkoxysilane, a partial cohydrolytic condensate of a phenyltrialkoxysilane and a dimethyldialkoxysilane, or a partial cohydrolytic condensate of a diphenyldialkoxysilane and a methyltrialkoxysilane. Of the alkoxy groups, methoxy and ethoxy are preferred. In a further embodiment, using not only a silane compound of formula (1) wherein $R^1$ is methyl, but also a silane compound containing a phenyl group as component (A) in the curing composition, the compatibility between components (A) and (C) is improved.

In a still further embodiment wherein an epoxy group-containing silane compound and/or a partial (co)hydrolytic condensate thereof is used as an essential component for component (C), optionally in combination with a partial (co)hydrolytic condensate of methyltrimethoxysilane and/or methyltriethoxysilane, the silicone-base coating composition can form a cured coating having a very high surface hardness, excellent abrasion resistance and good water resistance and chemical resistance. If the content of epoxy group-containing silane units in component (C) is too high in this embodiment, the silicone-base coating composition may sometimes lose shelf stability. To avoid such inconvenience, it is preferred to use the epoxy group-containing silane compound either in the form of a partial cohydrolytic condensate thereof with another silane compound or in admixture with a partial (co)hydrolytic condensate of an epoxy group-free silane compound. Preferred examples of the epoxy group-containing silane compound include those epoxy group-containing alkoxysilane compounds of formula (2) wherein $R^3$ is an epoxy-containing hydrocarbon group selected from γ-glycidoxypropyl and β-(3,4-epoxycyclohexyl)ethyl, $R^2$ is an alkyl group selected from methyl and ethyl, and a=1 or 2, with the proviso that in the event of a=2, one of the two $R^3$ groups is methyl.

In a still further embodiment of the silicone-base coating composition, component (C) is a silane compound of formula (2) wherein $R^3$ is a fluorinated hydrocarbon group such as 3,3,3-trifluoropropyl and/or a partial (co)hydrolytic condensate thereof. This composition forms a cured coating having improved repellency to water and oil. In an embodiment where component (C) is a silane compound containing such a functional group as vinyl, γ-methacryloxypropyl or γ-acryloxypropyl and/or a partial (co)hydrolytic condensate thereof, reactivity with an organic material such as a polymerizable monomer is expected. In an embodiment where a silane compound of formula (2) wherein $R^3$ is γ-mercaptopropyl and/or a partial (co)hydrolytic condensate thereof is used, the composition forms a cured coating having improved adhesion to metals.

In the coating composition, the mixing proportion of the organosilicon compound-curing composition and component (C) is such that 1 to 200 parts by weight of the curing composition is present per 100 parts by weight of component (C). If the amount of the curing composition is less than 1 pbw, the curing time is prolonged beyond the practically acceptable level. If the amount of the curing composition is more than 200 pbw, no further improvement in cure is achieved and the silicone-base coating composition may become less shelf stable and form a cured coating lacking any of the properties of transparency, surface hardness and adhesion. In a preferred embodiment, 5 to 150 parts by weight, especially 10 to 120 parts by weight of the curing composition is mixed with 100 parts by weight of component (C).

In the silicone-base coating composition of the invention, there may be incorporated (D) a polyorganosiloxane compound containing in its molecule a silicone oil structure and a silicone resin structure having alkoxy groups and/or silanol groups, which is compatible with component (C) and the components of the curing composition (i.e., components (A) and (B)). As component (D), a polyorganosiloxane compound containing in its molecule a linear siloxane structure and a branched siloxane structure having alkoxy groups and/or silanol groups, which is compatible with a silicone resin having a branched siloxane structure, as disclosed in JP-A 2002-88155 may be used without further processing.

Specifically, this organopolysiloxane compound is preferably such that the ratio M/N is from 0.1 to 50 provided that N is the number of silicon atoms originating from the silicone oil structure and M is the number of silicon atoms originating from the silicone resin structure. Also preferably, methyl groups account for at least 80 mol % of the substituent groups other than alkoxy and silanol groups that the polyorganosiloxane compound contains. It is noted that the organopolysiloxane compound can be obtained by reacting a polyorganosiloxane (a1) with another polyorganosiloxane (a2), both shown below, in the presence of a hydrosilylation catalyst.

(a1) Polyorganosiloxane having at least one aliphatic unsaturated double bond in a molecule, represented by average compositional formula (3):

Herein, $R^4$ is a group of one or more type selected from substituted or unsubstituted alkyl and aryl groups, $R^5$ is an aliphatic unsaturated double bond-containing group, $R^6$ is a group of one or more type selected from hydrogen and $C_1$–$C_4$ alkyl groups which may contain an ether bond, the subscripts b, c and d are numbers satisfying $0 \leq b < 1.5$, $0.01 \leq c \leq 1$, $0.5 \leq b+c \leq 1.8$, $0.01 \leq d \leq 2.5$, and $1 \leq b+c+d \leq 3$.

(a2) Polyorganosiloxane represented by general formula (4):

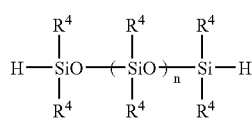

Herein, $R^4$ is as defined above, and n is a number of 0 to 1,000.

Since component (D) is highly compatible with the silicone-base coating composition comprising component (C) and the organosilicon compound-curing composition, the cured coating is devoid of milky turbidity and cissing and is improved in flexibility without detracting from cure, adhesion and weather resistance. Furthermore, owing to the inclusion of a linear siloxane structure consisting essentially of dimethylsiloxy units, the cured coating can be provided with various functions such as water repellency, water resistance, stain resistance, stain-proof (wiping off of marker ink), and anti-bill-posting.

An appropriate amount of the polyorganosiloxane compound (D) may be simply mixed with the curable organosilicon compound (C). Preferably 0.1 to 50 parts by weight of component (D) is mixed with 100 parts by weight of component (C). Less than 0.1 pbw of component (D) may achieve an insufficient improvement in flexibility whereas more than 50 pbw of component (D) may detract from the surface hardness, adhesion and other properties of a cured coating. More preferably 0.5 to 30 pbw, most preferably 1 to 20 pbw of component (D) is mixed with 100 pbw of component (C).

In the silicone-base coating composition of the invention, there may be further incorporated (E) a (meth)acrylic resin containing hydrolyzable silyl groups and/or silanol groups, having a weight average molecular weight of 5,000 to 30,000, which is compatible with component (C) and the components of the curing composition. Component (E) is uniformly dispersible in the silicone-base coating composition so that it may not cause milky turbidity to a cured coating. The addition of component (E) to the silicone-base coating composition significantly improves the adhesion of the composition to organic resins as typified by thermoplastic resins such as polypropylene, vinyl chloride resins, acrylic resins and polyester resins.

To achieve the addition effect, the (meth)acrylic resin should have a weight average molecular weight (Mw) of 5,000 to 30,000. If Mw is below 5,000, the improvement in the adhesion to organic resins may be insufficient. If Mw is above 30,000, the (meth)acrylic resin may become less compatible with component (C) and the components of the curing composition, sometimes causing milky turbidity to a cured coating or phase separation. More preferably, Mw is in a range of 8,000 to 25,000, most preferably 10,000 to 20,000.

Also, the (meth)acrylic resin (E) contains hydrolyzable silyl groups and/or silanol groups on side chains and/or ends of its polymeric molecular chain. The inclusion of hydrolyzable silyl groups and/or silanol groups enables that the (meth)acrylic resin is uniformly dispersed in the silicone-base coating composition, and is effective for enhancing the adhesion of a cured coating to any organic resin because during coating formation, a coating cures while co-condensation reaction between silyl and/or silanol groups and hydrolyzable groups in component (C) and the components of the curing composition takes place to produce a crosslinked structure. In view of this curing mechanism, the amount of silyl and/or silanol groups introduced in the (meth)acrylic polymer is a factor that affects adhesion. Provided that the polymer is divided into monomer components, too low a content of a silyl and/or silanol group-containing monomer may lead to an insufficient adhesion improving effect whereas too high a content entails a relatively reduced amount of the organic component available at the interface with the organic resin during coating formation, so that the relevant component may not effectively act, resulting in a decline of adhesion instead. Since the silane compound is expensive as compared with the (meth)acrylic monomer among reactants used in the preparation of component (E), increasing the amount of the silane compound used adds to the cost. Thus, the content of the silyl and/or silanol group-containing monomer is preferably 1 to 30 mol %, more preferably 3 to 20 mol % of the entire monomer components.

Specifically, the hydrolyzable silyl groups and/or silanol groups are groups of the following general formula (5).

Herein, X is a hydroxyl group or a hydrolyzable group selected from among alkoxy groups such as methoxy, ethoxy and isopropoxy, acyloxy groups such as acetoxy, oxime groups such as methyl ethyl ketoxime, amide groups such as N-ethylacetamide, alkenoxy groups such as isopropenoxy, and amino groups such as dimethylamino and diethylamino. $R^7$ is a hydrogen atom, or a monovalent hydrocarbon group of 1 to 10 carbon atoms, selected from among, for example, alkyl groups such as methyl, ethyl, propyl, butyl, hexyl and decyl, cycloalkyl groups such as cyclohexyl, and aryl groups such as phenyl and tolyl. The subscript e is an integer of 1 to 3.

The (meth)acrylic resin containing hydrolyzable silyl groups and/or silanol groups can be prepared, for example, by the following processes (I) and (II).

(I) This process uses an unsaturated (meth)acrylic polymer having a carbon-to-carbon double bond and a hydrosilane compound of the general formula (6) and effects addition reaction of the hydrosilane compound to the carbon-to-carbon double bond.

$$HSiX_eR^7_{3-e} \quad (6)$$

Herein, X, $R^7$ and e are as defined in formula (5).

Examples of the hydrosilane compound of formula (6) include alkoxysilanes such as trimethoxysilane, triethoxysilane, triisopropoxysilane, methyldimethoxysilane, methyldiethoxysilane, phenyldimethoxysilane, and dimethylmethoxysilane; acyloxysilanes such as triacetoxysilane, methyldiacetoxysilane, and phenyldiacetoxysilane; oximesilanes such as trismethylethylketoximesilane; and alkenoxysilanes such as triisopropenoxysilane. These hydrosilane compounds may be used alone or in admixture of any.

It is not critical how to prepare the unsaturated (meth)acrylic polymer used in Process (I). The polymer may be prepared by prior art well-known methods. For example, by copolymerizing a (meth)acrylic monomer containing a first functional group such as a carboxyl, hydroxyl or epoxy group with a functional group-free (meth)acrylic monomer such as methyl methacrylate to form a copolymer, and reacting an unsaturated compound having a second functional group capable of reacting with the first functional group and a carbon-to-carbon double bond with the functional groups in the copolymer, there can be prepared an unsaturated (meth)acrylic polymer having carbon-to-carbon double bonds on side chains of the polymer molecular chain.

(II) This process is by copolymerizing a (meth)acrylic monomer with an unsaturated silane compound of the following general formula (7).

$$R^8SiX_eR^7_{3-e} \quad (7)$$

Herein, X, $R^7$ and e are as defined in formula (5), and $R^8$ is an organic group having a polymerizable double bond such as a vinyl, acryloxymethyl, γ-acryloxypropyl, methacryloxymethyl or γ-methacryloxypropyl group.

Examples of the unsaturated silane compound of formula (7) include vinylsilanes such as vinyltrimethoxysilane, vinyltriethoxysilane, vinyltriisopropoxysilane, vinyltriacetoxysilane, vinyltrismethylethylketoximesilane, vinyltriisopropenoxysilane, vinylmethyldimethoxysilane, and vinyldimethylmethoxysilane;

acrylic silanes such as acryloxymethyltrimethoxysilane, acryloxymethyltriethoxysilane, acryloxymethylmethyldimethoxysilane, acryloxymethyldimethylmethoxysilane, γ-acryloxypropyltrimethoxysilane, γ-acryloxypropyltriethoxysilane, γ-acryloxypropylmethyldimethoxysilane, γ-acryloxypropylmethyldiethoxysilane, and γ-acryloxypropyldimethylmethoxysilane;

methacrylic silanes such as methacryloxymethyltrimethoxysilane, methacryloxymethyltriethoxysilane, methacryloxymethylmethyldimethoxysilane, methacryloxymethyldimethylmethoxysilane, γ-methacryloxypropyltrimethoxysilane, γ-methacryloxypropyltriethoxysilane, γ-methacryloxypropylmethyldimethoxysilane, γ-methacryloxypropylmethyldiethoxysilane, and γ-methacryloxypropyldimethylmethoxysilane; and styrylsilanes such as styryltrimethoxysilane, styryltriethoxysilane, styrylmethyldimethoxysilane, N-vinylbenzyl-γ-aminopropyltrimethoxysilane, and N-vinylbenzyl-γ-aminopropylmethyldimethoxysilane. These unsaturated silane compounds may be used alone or in admixture of any.

Examples of the (meth)acrylic monomer used in Process (I) or (II) to produce the (meth)acrylic resin containing hydrolyzable silyl groups and/or silanol groups include acrylic acid, methacrylic acid, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, amyl acrylate, amyl methacrylate, isoamyl acrylate, isoamyl methacrylate, hexyl acrylate, hexyl methacrylate, cyclohexyl acrylate, cyclohexyl methacrylate, n-octyl acrylate, n-octyl methacrylate, 2-ethylhexyl acrylate, 2-ethylhexyl methacrylate, isobornyl acrylate, isobornyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, acrylamide, methacrylamide, N-methylolacrylamide, N-methylolmethacrylamide, glycidyl acrylate, glycidyl methacrylate, trifluoropropyl acrylate and trifluoropropyl methacrylate.

In either process, UV-absorbing (meth)acrylic monomers may be used, in part, for the purpose of imparting weather resistance. Examples include substituted benzotriazole and benzophenone compounds, such as 2-(2'-hydroxy-5'-(meth)acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)phenyl]5-chloro-2H-benzotriazole, 2-[2'-hydroxy-3'-methyl-5'-(8-(meth)acryloxyoctyl)phenyl]-2H-benzotriazole, 2-hydroxy-4-(2-(meth)acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)benzophenone. In the (meth)acrylic resin used as component (E) in the silicone-base coating composition of the invention, it is preferred from the standpoints of surface hardness of a cured coating and adhesion to organic resins that methyl methacrylate be used in an amount of at least 30 mol %, more preferably at least 50 mol % of the entire monomer components.

Optionally, other copolymerizable vinyl monomers such as styrene, α-methylstyrene, maleic acid, butadiene, acrylonitrile and vinyl acetate may be used, in part, insofar as the addition effect of component (E) and the desired properties of the silicone-base coating composition are not compromised.

Accordingly, the (meth)acrylic resin as component (E) is conveniently prepared by Process (II), i.e., by copolymerizing an unsaturated silane compound having a polymerizable double bond and a hydrolyzable silyl group with methyl methacrylate or a similar (meth)acrylic monomer and optionally, another copolymerizable vinyl monomer in the presence of a radical polymerization initiator (e.g., azobisisobutyronitrile), because of process simplicity and the like. In this process, the polymerization step may be carried out in any desired mode, for example, a mode of bulk addition of monomers followed by polymerization, a mode of polymerizing portions of monomers and then continuously or intermittently adding the remaining portions, or a continuous mode of continuously adding monomers from the initial stage of polymerization. A combination of any of these polymerization modes is also acceptable.

The preferred polymerization mode is solution polymerization. Any desired solvent may be used to this end as long as it is a volatile solvent in which the (meth)acrylic resin is dissolvable. Preferred are alcohol solvents, ketone solvents, ether solvents and ester solvents. From the standpoint of omitting any loss in the preparation process and cost, it is rational that the (meth)acrylic resin solution resulting from solution polymerization is used in the subsequent step without concentration or otherwise processing, that is, directly mixed with component (C), the components of the curing composition and optional component (D) to formulate a silicone-base coating composition. From the standpoint of reducing the organic solvent content, however, it is recommended that the content of organic solvent in the (meth)acrylic resin solution be 50% by weight or less at the mixing stage. Further, in order that the silicone-base coating composition be solventless, the solution polymerization step may be followed by a solvent exchange operation using component (C) in which the (meth)acrylic resin is dissolvable or dispersible.

In the embodiment wherein component (E) is incorporated in the silicone-base coating composition of the invention, component (E) is preferably used in an amount of 0.1 to 10 parts by weight per 100 parts by weight of component (C). Less than 0.1 pbw of component (E) may provide an insufficient improvement in the adhesion to organic resins whereas more than 10 pbw of component (E) may render a cured coating milky turbid. More preferably, component (E) is used in an amount of 0.2 to 5 pbw, most preferably 0.2 to 3 pbw per 100 pbw of component (C).

In the silicone-base coating composition of the invention, any of various additives such as pigments, dyes, fillers, adhesion improvers, leveling agents, inorganic or organic UV absorbers, storage stability improvers, plasticizers, and antioxidants may be further added depending on a particular use and insofar as the benefits of the invention are not impaired. It is appreciated that the silicone-base coating composition of the invention is basically a solventless coating agent that does not contain any organic solvent which is combustible and harmful to the human body although it may be diluted with an organic solvent, if necessary from a particular application or for ease of working.

When the silicone-base coating composition of the invention is prepared, the silicone resin-curing composition which has been prepared from components (A) and (B) may be simply mixed with component (C) and optionally components (D) and (E) and other additives, all in predetermined amounts. The temperature of the mixing step is not particularly limited, and any particular temperature adjustment such as heating is generally unnecessary. The desired composition is readily obtainable by simply agitating and mixing at room temperature for a time of at least 10 minutes, preferably 20 to 60 minutes. It is noted that the mixing step is preferably carried out in a nitrogen atmosphere because hydrolyzable groups such as alkoxy groups undergo hydrolysis if water is introduced.

By prior art well-known methods, the silicone-base coating composition of the invention can be applied and cured to various metal substrates, wood, stone, mortar plates, slates, roofing tiles, concrete, glass, ceramics, plastics, and organic resin-coated articles, to form a cured coating thereon. The application methods include brush coating, spray coating, dipping, flow coating, knife coating, and spin coating. Further, in situ coating is possible.

The coating weight varies with the type of substrate and the purpose of coating although it is generally such as to provide a cured coating with a thickness in the range of 0.1 to 200 μm, more preferably 1 to 100 μm.

Under any conditions, the silicone-base coating composition is cured. Since the composition is cured with airborne moisture to form a coating, it is usually allowed to stand at a temperature in the range from room temperature to 50° C. for about 5 minutes to about 2 hours until it becomes dry or tack-free and for further several hours to several days until the curing reaction is complete. During the coating, drying and curing steps, heat treatment may be optionally carried out insofar as the substrate to be coated and the characteristics of the coated composition are not adversely affected. If the silicone-base coating composition is exposed to elevated temperature at the initial stage of drying step, undesirably the silane compound therein can evaporate off and moisture necessary for curing is no available. It is appreciated that a primary object of the invention is to provide a silicone-base coating composition having improved drying and curing characteristics. In fact, the invention is successful in significantly improving the drying characteristics in a room temperature atmosphere.

EXAMPLE

Examples and Comparative Examples are given below for illustrating the invention, but the invention is not limited thereto. In the Examples, the viscosity is a measurement at 25° C. The weight average molecular weight (Mw) of a (meth)acrylic resin in each Preparation Example is computed by determining GPC data using tetrahydrofuran as a solvent and plotting on a calibration line based on polystyrene standards.

Preparation Examples 1 to 6

Curing compositions (AB-1 to AB-6) for use with silicone resins were prepared by combining components (A) and (B) in accordance with the formulation (wt %) shown in Table 1 and agitating and mixing at room temperature for 2 hours. Note that the components shown in Table 1 are identified below.

Component (A), Silane Compound
A-1: dimethyldimethoxysilane
A-2: diphenyldimethoxysilane Component (B), Phosphoric Acid
B-1: orthophosphoric acid (85% pure grade)

TABLE 1

|  |  | Preparation Example No. |  |  |  |  |  |
| --- | --- | --- | --- | --- | --- | --- | --- |
|  |  | 1 | 2 | 3 | 4 | 5 | 6 |
|  |  | Curing composition No. |  |  |  |  |  |
|  |  | AB-1 | AB-2 | AB-3 | AB-4 | AB-5 | AB-6 |
| Component A (wt %) | A-1 | 94 | 88 | 70 | 65 | 99.7 | 40 |
|  | A-2 | — | — | — | 15 | — | — |
| Component B (wt %) | B-1 | 6 | 12 | 30 | 20 | 0.3 | 60 |

In Examples, the compounds identified below were used as components (C), (D) and (E) and organometallic curing catalyst (F).

Component (C), Silane Compound or Partial (Co)Hydrolytic Condensate
C-1: partial hydrolytic condensate of methyltrimethoxysilane (average degree of polymerization 5, viscosity 5 mm$^2$/s)
C-2: partial hydrolytic condensate of methyltrimethoxysilane (average degree of polymerization 10, viscosity 25 mm$^2$/s)
C-3: partial cohydrolytic condensate of 60 mol % methyltrimethoxysilane and 40 mol % dimethyldimethoxysilane (average degree of polymerization 20, viscosity 88 mm$^2$/s)
C-4: partial cohydrolytic condensate of 20 mol % methyltrimethoxysilane, 60 mol % propyltrimethoxysilane and 20 mol % tetraethoxysilane (average degree of polymerization 5, viscosity 8 mm$^2$/s)
C-5: propyltriethoxysilane
C-6: partial cohydrolytic condensate of 30 mol % dimethyldimethoxysilane and 70 mol % phenyltrimethoxysilane (average degree of polymerization 12, viscosity 134 mm$^2$/s)
C-7: partial cohydrolytic condensate of 88 mol % methyltrimethoxysilane and 12 mol % diphenyldimethoxysilane (average degree of polymerization 8, viscosity 22 mm$^2$/s)
C-8: γ-glycidoxypropylmethyldiethoxysilane Component (D), Polyorganosiloxane Compound
D-1: polyorganosiloxane compound obtained in Preparation Example 7 below Preparation Example 7

A 2-liter flask equipped with a stirrer, condenser, thermometer and dropping funnel was charged with 1158 g of methyltrimethoxysilane and 198 g of vinylmethyldimethoxysilane. With stirring at 25° C., 188 g of a 0.05N hydrochloric acid solution was added dropwise. Hydrolytic reaction was continued for 2 hours while keeping the methanol by-product under reflux. The flask was heated to 120° C. for distilling off the methanol by-product, then cooled down to room temperature. Filtration yielded 850 g of a partial cohydrolytic condensate of 85 mol % methyltrimethoxysilane and 15 mol % vinylmethyldimethoxysilane (average degree of polymerization 21, viscosity 56 mm$^2$/s). In subsequence, a 0.5-liter flask equipped with a stirrer, condenser and thermometer was charged with 259 g of the above-obtained partial cohydrolytic condensate and 125 g of a polydimethylsiloxane having Si—H groups at both ends (average degree of polymerization 20), to which 1.5 g of a platinum catalyst CAT-PL-50T (trade name by Shin-Etsu Chemical Co., Ltd.) was added whereupon hydrosilylation reaction was effected at 80° C. for 8 hours. The disappearance of Si—H groups was confirmed by IR analysis. Under a vacuum of 10 mmHg, the reaction solution was heat treated at 120° C. for 2 hours for removing the low-boiling matter. After cooling to room temperature, it was filtered to collect 360 g of a methoxy group-containing polyorganosiloxane compound (D-1) having a viscosity of 162 mm$^2$/s.

Component (E), Silyl Group-Containing (Meth)Acrylic Resin
E-1: trimethoxysilyl group-containing (meth)acrylic copolymer solution obtained in Preparation Example 8 below Preparation Example 8

A 1-liter flask equipped with a stirrer, condenser, thermometer and two dropping funnels was charged with 90 g of propylene glycol monomethyl ether acetate and heated at 80° C. with stirring. One dropping funnel contained a mixture of 240 g (2.4 mol) of methyl methacrylate, 77 g (0.6 mol) of n-butyl acrylate, 78 g (0.6 mol) of 2-hydroxyethyl methacrylate, and 99 g (0.4 mol) of γ-methacryloxypropyltrimethoxysilane. The other dropping funnel contained a solution of 8 g of 2,2'-azobis(2-methylbutyronitrile) in 122 g of propylene glycol monomethyl ether acetate. While the internal temperature was maintained at 80° C., dropwise addition from two directions was continued over 5 hours for carrying out solution polymerization. This was followed by ripening reaction at 80° C. for 3 hours. After cooling to room temperature, the reaction solution was filtered to collect 630 g of a trimethoxysilyl group-containing (meth)acrylic copolymer solution (E-1) having a solids concentration of 70% and a Mw of 14,800.

Component (F), Organometallic Curing Catalyst
F-1: tetra-n-butyltitanate polymer (trade name TBT-700 by Nippon Soda Co., Ltd.)
F-2: di-n-butoxyaluminum ethylacetoacetate (trade name Kerope ACS by Hope Chemical Co., Ltd.)

Examples 1 to 13 & Comparative Examples 1 to 8

A series of silicone-base coating compositions were prepared by combining the components in accordance with the formulation (pbw) shown in Table 2 and agitating and mixing in a nitrogen atmosphere at room temperature for 30 minutes. The resulting compositions were examined for fluid appearance, cure property and storage stability by the following tests (i), (ii) and (iii). Each silicone-base coating composition was further applied to one surface of a glass plate (5 cm wide, 15 cm long, 2 mm thick) in such a buildup that a cured film might have a thickness of about 20 μm, and allowed to stand in an atmosphere of 25° C. and relative humidity 65% for one day whereupon the coating cured. The cured coating was examined for physical properties (transparency, surface hardness, adhesion, solvent resistance, water resistance, flexibility and accelerated weatherability) by the following tests (iv) to (x). Additionally, the compositions of Examples 2, 6–9 and 13 were examined for recoat property by the following test (xi); the compositions of Examples 2, 5, 11 and 12 were examined for stain resistance by the following test (xii); the compositions of Examples 2, 7 and 13 were examined for adhesion to organic substrate by the following test (xiii). The results are shown in Tables 2 to 4.

Tests on Silicone-Base Coating Composition (i) Fluid Appearance (Clarity)

The outer appearance of a fluid silicone-base coating composition was visually observed and rated according to the following criterion.
○: fully clear
Δ: somewhat turbid
X: fully milky turbid (ii) Cure (Drying=Tack-Free Time)

A silicone-base coating composition was applied to one surface of a glass plate (as described above) and allowed to stand in a chamber of 25° C. and RH 65%. The time taken until the coating became tacky-dry was measured. A sample was marked "X" when it did not become tacky-dry even after 48 hours.

(iii) Storage Stability

A silicone-base coating composition was contained in a glass bottle, which was closed with a plug. The bottle was allowed to stand at 40° C. for 30 days, after which the outer appearance of the fluid was visually observed and rated according to the following criterion.
○: intact (not become thick or turbid)
Δ: some thickening or turbidity
X: gelled or substantial thickening/turbidity (iv) Transparency The outer appearance of a coating was visually observed and rated according to the following criterion.
○: fully transparent
Δ: partially turbid
X: overall milky turbid (v) Surface Hardness Measured according to the scratch hardness (pencil) method of JIS K 5600-5-4.

(vi) Adhesion

Measured according to the crosscut adhesion test of JIS K 5600-5-6.

(vii) Solvent Resistance (on Xylene Rubbing)

A surface of a coating was rubbed with cotton wadding impregnated with xylene over 100 back-and-forth strokes, after which the outer appearance was visually observed and rated according to the following criterion.
○: intact
Δ: somewhat whitened or roughened surface
X: substantially whitened or flawed surface (viii) Water Resistance A test piece was immersed in city water at room temperature for 72 hours, after which it was subjected to the adhesion test (vi).

(ix) Flexibility

A silicone-base coating composition was applied and cured to a substrate as described above except that the substrate used was a cold rolled steel strip of 5 cm wide, 15 cm long, 0.3 mm thick. The sample was subjected to the flexural resistance test of JIS K 5600-5-1. After bent around a cylindrical mandrel having a diameter of 10 mm, the coating was visually observed for outer appearance and rated according to the following criterion.
○: intact (when tested on a mandrel having a diameter smaller than 10 mm, the diameter was reported)
Δ: partially cracked
X: totally cracked (x) Accelerated Weatherability A due cycle test (8 hours of 70° C. UV exposure plus 4 hours of 50° C. wet exposure) was conducted 500 hours using a weatherometer Atlas UVCON (Toyo Seiki Seisaku-sho Co., Ltd.). At the end of the test, the coating was visually observed for outer appearance and rated according to the following criterion.
○: intact
Δ: some cracks or choking
X: substantial cracks or choking (xi) Recoat Property Onto a coating, a silicone-base coating composition of the same formulation was applied and dried in an atmosphere of 25° C. and RH 65% for 8 hours. The coating was visually observed for outer appearance and rated according to the following criterion.
○: smooth integral coating
Δ: wrinkles at edges of coating
X: substantial wrinkles or cissing of coating (xii) Stain Resistance (Marker Ink Wiping Off)

A marking/wiping cycle of marking a coating with a black oil ink pen (Magic Ink®, Pentel Co., Ltd.), air drying for 5 minutes, and wiping with commercial tissue paper was repeated. Through visual observation, the coating was rated according to the following criterion.
○: wiping possible over 5 cycles, no ink marks found
Δ: wiping possible within 1–4 cycles, some ink marks
X: wiping impossible, noticeable ink marks (xiii) Adhesion to Organic Substrate A silicone-base coating composition was applied and cured to a substrate as described above except that the substrate used was a commercially available vinyl chloride floor tile of 4 mm thick. The cured coating was subjected to a crosscut peel test of providing crosscuts in the coating with a cutter knife, attaching an adhesive tape, and peeling the adhesive tape. It was observed how many coating sections were stripped together with the adhesive tape. The coating was rated according to the following criterion.
○: no stripping
Δ: some sections stripped
X: totally stripped

TABLE 2

| Formulation (pbw) | | Example | | | | | | |
|---|---|---|---|---|---|---|---|---|
| | | 1 | 2 | 3 | 4 | 5 | 6 | 7 |
| Curing composition | AB-1 | 120 | | | | | | |
| | AB-2 | | 100 | | 60 | | 50 | 80 |
| | AB-3 | | | 15 | | 30 | | |
| | AB-4 | | | | | | | |

TABLE 2-continued

| Formulation (pbw) | | Example | | | | | | |
|---|---|---|---|---|---|---|---|---|
| | | 1 | 2 | 3 | 4 | 5 | 6 | 7 |
| | AB-5 | | | | | | | |
| | AB-6 | | | | | | | |
| Organometallic curing catalyst | F-1 | | | | | | | |
| | F-2 | | | | | | | |
| Component C | C-1 | 100 | 100 | 100 | | | | 60 |
| | C-2 | | | | 100 | | | |
| | C-3 | | | | | 100 | | |
| | C-4 | | | | | | 100 | |
| | C-5 | | | | | | | 40 |
| | C-6 | | | | | | | |
| | C-7 | | | | | | | |
| | C-8 | | | | | | | |
| Components D and E | D-1 | | | | | | | |
| | E-1 | | | | | | | |
| | | Test results | | | | | | |
| (i) Fluid appearance | | ○ | ○ | ○ | ○ | ○ | ○ | ○ |
| (ii) Cure (min) | | 5 | 5 | 5 | 10 | 20 | 10 | 5 |
| (iii) Storage stability | | ○ | ○ | ○ | ○ | ○ | ○ | ○ |
| (iv) Transparency | | ○ | ○ | ○ | ○ | ○ | ○ | ○ |
| (v) Surface hardness | | 4H | 4H | 5H | 2H | 2H | 3H | 3H |
| (vi) Adhesion (/100) | | 100 | 100 | 100 | 100 | 100 | 100 | 100 |
| (vii) Solvent resistance | | ○ | ○ | ○ | ○ | ○ | ○ | ○ |
| (viii) Water resistance (/100) | | 100 | 100 | 100 | 100 | 100 | 90 | 100 |
| (ix) Flexibility | | Δ | Δ | Δ | ○–Δ | ○ | ○ | ○ |
| (x) Accelerated weatherability | | ○ | ○ | Δ | ○ | ○ | ○ | ○ |
| (xi) Recoat property | | — | ○–Δ | — | — | — | ○ | ○ |
| (xii) Stain resistance | | — | Δ | — | — | Δ | — | — |
| (xiii) Adhesion to organic substrate | | — | Δ | — | — | — | — | Δ |

TABLE 3

| Formulation (pbw) | | Example | | | | | |
|---|---|---|---|---|---|---|---|
| | | 8 | 9 | 10 | 11 | 12 | 13 |
| Curing composition | AB-1 | | | 100 | | | |
| | AB-2 | | | | 80 | 100 | 80 |
| | AB-3 | | | | | | |
| | AB-4 | 60 | 50 | | | | |
| | AB-5 | | | | | | |
| | AB-6 | | | | | | |
| Organometallic curing catalyst | F-1 | | | | | | |
| | F-2 | | | | | | |
| Component C | C-1 | | | 70 | 100 | 50 | 60 |
| | C-2 | | | | | 50 | |
| | C-3 | | | | | | |
| | C-4 | | | | | | |
| | C-5 | | | | | | 40 |
| | C-6 | 100 | | | | | |
| | C-7 | | 100 | | | | |
| | C-8 | | | 30 | | | |
| Components D and E | D-1 | | | | 3 | 20 | |
| | E-1 | | | | | | 1 |
| | | Test results | | | | | |
| (i) Fluid appearance | | ○ | ○ | ○ | ○ | ○ | ○ |
| (ii) Cure (min) | | 60 | 10 | 10 | 5 | 15 | 5 |
| (iii) Storage stability | | ○ | ○ | ○ | ○ | ○ | ○ |
| (iv) Transparency | | ○ | ○ | ○ | ○ | ○ | ○ |
| (v) Surface hardness | | H | 2H | 8H | 2H | F | 3H |
| (vi) Adhesion (/100) | | 90 | 100 | 100 | 100 | 100 | 100 |
| (vii) Solvent resistance | | ○ | ○ | ○ | ○ | ○ | ○ |
| (viii) Water resistance (/100) | | 100 | 100 | 100 | 100 | 100 | 100 |
| (ix) Flexibility | | ○ | ○ | Δ | 8–○ | 4–○ | ○ |
| (x) Accelerated weatherability | | Δ | ○ | Δ | ○ | ○ | ○ |
| (xi) Recoat property | | ○ | ○ | — | — | — | ○ |
| (xii) Stain resistance | | — | — | — | ○ | ○ | — |
| (xiii) Adhesion to organic substrate | | — | — | — | — | — | ○ |

TABLE 4

| Formulation (pbw) | | Comparative Example | | | | | | | |
|---|---|---|---|---|---|---|---|---|---|
| | | 1 | 2 | 3 | 4 | 5 | 6 | 7 | 8 |
| Curing composition | AB-1 | | | | | | | | |
| | AB-2 | | 250 | | | | | | |
| | AB-3 | 0.5 | | | | | | | |
| | AB-4 | | | | | | | | |
| | AB-5 | | | 180 | | | | | |
| | AB-6 | | | | 10 | | | | |
| Organometallic curing catalyst | F-1 | | | | | 3 | 10 | | |
| | F-2 | | | | | | | 10 | 15 |
| Component C | C-1 | 100 | 100 | 100 | 100 | | | | |
| | C-2 | | | | | 100 | | 100 | |
| | C-3 | | | | | | | | 100 |
| | C-4 | | | | | | | | |
| | C-5 | | | | | | | | |
| | C-6 | | | | | | 100 | | |
| | C-7 | | | | | | | | |
| | C-8 | | | | | | | | |
| Components D and E | D-1 | | | | | | | | |
| | E-1 | | | | | | | | |
| | | Test results | | | | | | | |
| (i) Fluid appearance | | ○ | ○ | ○ | Δ | ○ | ○ | ○ | ○ |
| (ii) Cure (min) | | 1800 (30h) | 90 | 2160 (36h) | 5 | 60 | X | 90 | X |
| (iii) Storage stability | | ○ | Δ | ○ | X | ○ | ○ | ○ | ○ |
| (iv) Transparency | | X | Δ | X | Δ | ○ | — | ○ | — |
| (v) Surface hardness | | — | H | — | 4H | F | — | 4H | — |
| (vi) Adhesion (/100) | | — | 40 | — | 70 | 100 | — | 80 | — |
| (vii) Solvent resistance | | — | Δ | — | ○ | ○ | — | ○ | — |
| (viii) Water resistance (/100) | | — | 0 | — | 50 | 100 | — | 30 | — |
| (ix) Flexibility | | — | X | — | X | Δ | — | X | — |
| (x) Accelerated weatherability | | — | Δ | — | X | ○ | — | X | — |
| (xi) Recoat property | | — | — | — | — | — | — | — | — |
| (xii) Stain resistance | | — | — | — | — | — | — | — | — |
| (xiii) Adhesion to organic substrate | | — | — | — | — | — | — | — | — |

It is evident from the results shown in Tables that the silicone-base coating compositions of the invention are fully stable during storage and curable at room temperature, and form cured coatings having improved transparency, surface hardness, adhesion, solvent resistance, water resistance and weather resistance. In contrast, the compositions of Comparative Examples 1, 3, 6 and 8 are poorly curable at room temperature, the compositions of Comparative Examples 2, 4, 5 and 7 lack any one of cure, storage stability and film properties. Through a careful selection of component (C) and the addition of components (D) and (E), the present invention is successful in further improving flexibility, recoat property, stain resistance and adhesion to organic resins. Therefore, the invention is widely utilizable as a solventless, RTV silicone-base coating composition of one part type for the purposes of providing surface protection and imparting functions to various articles.

There has been described a curing composition which is suited for use with organosilicon compounds, i.e., added to a curable organosilicon compound to formulate a silicone-base coating composition which remains shelf stable and quickly cures at room temperature after being applied to a substrate, to form a cured coating having transparency, surface hardness, adhesion and the like. A silicone-base coating composition having the curing composition formulated therein is effective as a solventless, RTV silicone coating composition of one part type.

Japanese Patent Application No. 2003-174670 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone-base coating composition comprising in admixture 1 to 200 parts by weight of a curing composition comprising (A) 50 to 99.5% by weight of a silane compound having the general formula (1):

$$R^1_2Si(OR^2)_2 \quad (1)$$

wherein $R^1$ is methyl, and $R^2$ is methyl or ethyl, and (B) 0.5 to 50% by weight of phosphoric acid, and (C) 100 parts by weight of a curable organosilicon compound which is a silane compound having the general formula (2):

$$R^3_aSi(OR^2)_{4-a} \quad (2)$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group, or $C_3$–$C_5$ alkoxyalkyl group, and "a" is 0, 1, or 2, or a partial (co)hydrolytic condensate thereof or a mixture thereof, wherein component (C) comprises a partial (co)hydrolytic condensate of a silane compound having formula (2) wherein $R^3$ is methyl, $R^2$ is methyl or ethyl, and "a"=1 or a partial (co)hydrolytic condensate of said silane compound and another silane compound having formula (2).

2. A siliconebase coating composition comprising in admixture (C) 100 parts by weight of a curable organosilicon compound which is a silane compound having the general formula (2):

$$R^3_a Si(OR^2)_{4-a} \quad (2)$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group, or $C_3$–$C_5$ alkoxyalkyl group, and "a" is 0, 1, or 2, or a partial (co)hydrolytic condensate thereof or a mixture thereof, and 1 to 200 parts by weight of a curing composition comprising (A) 50 to 99.5% by weight of a silane compound having the general formula (1):

$$R^1_2 Si(OR^2)_2 \quad (1)$$

wherein $R^1$ is methyl and $R^2$ is methyl or ethyl, and (B) 0.5 to 50% by weight of phosphoric acid, said component (C) comprising a partial cohydrolytic condensate of a silane compound (i) having formula (2) wherein $R^3$ is methyl, $R^2$ is methyl or ethyl, and a=1 and a silane compound (ii) having formula (2) wherein $R^3$ is methyl, $R^2$ is methyl or ethyl, and a=2, or a partial cohydrolytic condensate of said silane compounds (i) and (ii) and another silane compound having formula (2).

3. A silicone-base coating composition comprising in admixture (C) 100 parts by weight of a curable organosilicon compound which is a silane compound having the general formula (2):

$$R^3_a Si(OR^2)_{4-a} \quad (2)$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group, or $C_3$–$C_5$ alkoxyalkyl group, and "a" is 0, 1, or 2, or a partial (co)hydrolytic condensate thereof or a mixture thereof, and 1 to 200 parts by weight of a curing composition comprising (A) 50 to 99.5% by weight of a silane compound having the general formula (1):

$$R^1_2 Si(OR^2)_2 \quad (1)$$

wherein $R^1$ is methyl and $R^2$ is methyl or ethyl, and (B) 0.5 to 50% by weight of phosphoric acid, said component (C) comprising a partial (co)hydrolytic condensate of a silane compound having formula (2) wherein $R^3$ is propyl, $R^2$ is methyl or ethyl, and a=1 or a partial (co)hydrolytic condensate of said silane compound and another silane compound having formula (2).

4. A silicone-base coating composition comprising in admixture (C) 100 parts by weight of a curable organosilicon compound which is a silane compound having the general formula (2):

$$R^3_a Si(OR^2)_{4-a} \quad (2)$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group, or $C_3$–$C_5$ alkoxyalkyl group, and "a" is 0, 1, or 2, or a partial (co)hydrolytic condensate thereof or a mixture thereof, and 1 to 200 parts by weight of a curing composition comprising (A) 50 to 99.5% by weight of a silane compound having the general formula (1):

$$R^1_2 Si(OR^2)_2 \quad (1)$$

wherein $R^1$ is methyl and $R^2$ is methyl or ethyl, and (B) 0.5 to 50% by weight of phosphoric acid, said component (C) comprising a partial (co)hydrolytic condensate of a silane compound having formula (2) wherein $R^3$ is propyl, $R^2$ is methyl or ethyl, and a=1 or 2 a partial (co)hydrolytic condensate of said silane compound and another silane compound having formula (2).

5. A silicone-base coating composition comprising in admixture (C) 100 parts by weight of a curable organosilicon compound which is a silane compound having the general formula (2):

$$R^3_a Si(OR^2)_{4-a} \quad (2)$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group, or $C_3$–$C_5$ alkoxyalkyl group, and "a" is 0, 1, or 2, or a partial (co)hydrolytic condensate thereof or a mixture thereof, and 1 to 200 parts by weight of a curing composition comprising (A) 50 to 99.5% by weight of a silane compound having the general formula (I):

$$R^1_2 Si(OR^2)_2 \quad (1)$$

wherein $R^1$ is methyl and $R^2$ is methyl or ethyl, and (B) 0.5 to 50% by weight of phosphoric acid, said component (C) comprising a partial (co)hydrolytic condensate of an epoxy-bearing silane compound and/or a partial (co)hydrolytic condensate thereof, or a partial cohydrolytic condensate of said epoxy-bearing silane compound (iii) and a silane compound (iv) having formula (2) wherein $R^3$ is methyl, $R^2$ is methyl or ethyl, and a=1, or a partial cohydrolytic condensate of said silane compounds (iii) and (iv) and another silane compound having formula (2).

6. A silicone-base coating composition comprising in admixture 1 to 200 parts by weight of a curing composition comprising (A) 50 to 99.5% by weight of a silane compound having the general formula (1):

$$R^1_2 Si(OR^2)_2 \quad (1)$$

wherein $R^1$ is each independently a $C_1$–$C_3$ alkyl group, $C_2$–$C_3$ alkenyl group, or a phenyl group, and $R^2$ is each independently a $C_1$–$C_3$ alkyl group, $C_2$–$C_3$ acyl group, or $C_3$–$C_5$ alkoxyalkyl group, and (B) 0.5 to 50% by weight of phosphoric acid, and (C) 100 parts by weight of a curable organosilicon compound which is a silane compound having the general formula (2):

$$R^3_a Si(OR^2)_{4-a} \quad (2)$$

wherein $R^3$ is each independently a substituted or unsubstituted monovalent $C_1$–$C_{10}$ hydrocarbon group, $R^2$ is a $C_1$–$C_3$ alkyl group, $C_2$–$C_3$ acyl group, or $C_3$–$C_5$ alkoxyalkyl group, and is 0, 1, or 2, or a partial (co)hydrolytic condensate thereof or a mixture thereof, and (E) a (meth)acrylic resin containing hydrolyzable silyl groups and/or silanol groups and having a weight average molecular weight of 5,000 to 30,000, which (meth)acrylic resin is compatible with component (C) and the components of the curing composition, in an amount of 0.1 to 10 parts by weight per 100 parts by weight of component (C).

* * * * *